(12) United States Patent
Woo et al.

(10) Patent No.: US 10,264,115 B1
(45) Date of Patent: Apr. 16, 2019

(54) DETERMINING IF A MOBILE DEVICE IS BEING USED BY A DRIVER OF A VEHICLE

(71) Applicant: PAYPAL, INC., San Jose, CA (US)

(72) Inventors: Titus Woo, San Jose, CA (US); Brandon Scott Lerner, Scarsdale, NY (US); Justin Haddadnia, New York, NY (US); Shao-Fei Moy, San Jose, CA (US); Daniel Holly Wells, Madison, NJ (US); Raquel Buckley, Austin, TX (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 15/855,528

(22) Filed: Dec. 27, 2017

(51) Int. Cl.
*H04M 1/725* (2006.01)
*H04W 64/00* (2009.01)

(52) U.S. Cl.
CPC ........ *H04M 1/72577* (2013.01); *H04W 64/00* (2013.01)

(58) Field of Classification Search
CPC ... H04W 48/04; H04W 4/027; H04W 52/283; H04W 88/02; H04M 1/6075; H04M 1/72569; H04M 1/72577
See application file for complete search history.

(56) References Cited

U.S. PATENT DOCUMENTS

| 2002/0120374 | A1* | 8/2002 | Douros | G07C 5/0808 |
| | | | | 701/34.4 |
| 2010/0279626 | A1* | 11/2010 | Bradley | H04M 1/72577 |
| | | | | 455/69 |
| 2011/0065375 | A1* | 3/2011 | Bradley | H04M 1/72577 |
| | | | | 455/1 |

* cited by examiner

*Primary Examiner* — Diane D Mizrahi
(74) *Attorney, Agent, or Firm* — Haynes and Boone, LLP (57) ABSTRACT

A computer system determines whether a location of a computing device corresponds to a vehicle that is in motion. In response to determining that the location of the computing device corresponds to the vehicle that is in motion, and determining that the location of the computing device corresponds to an area in the vehicle that is associated with a driver of the vehicle, the computer system imposes one or more restrictions on a usage of the computing device.

20 Claims, 5 Drawing Sheets

DETERMINING IF A MOBILE DEVICE IS BEING USED BY A DRIVER OF A VEHICLE

TECHNICAL FIELD

The present disclosure relates to identifying whether a phone is in a vehicle, and more particularly to determining whether the phone is being utilized by a driver in the vehicle.

BACKGROUND

Today, with the sheer number of electronic devices that users are exposed to, users are taking their devices and using their devices everywhere. Oftentimes, this leads to devices being utilized by drivers, which can take the attention of a driver away from the road, leading to accidents that are potentially harmful to the driver, to other surrounding drivers and passengers, and to nearby pedestrians. Additionally, as the number of features on mobile devices increase, the level of distraction tends to increase as well.

DETAILED DESCRIPTION

Embodiments of the present disclosure provide a system, method, and program product. A computer system determines that a location of a computing device corresponds to a vehicle that is in motion and that the location of the computing device corresponds to an area in the vehicle that is associated with a driver of the vehicle. In response to determining that the location of the computing device corresponds to the vehicle that is in motion and corresponds to the area in the vehicle that is associated with the driver of the vehicle, the computer system imposes one or more restrictions on a usage of the computing device.

In the example embodiment, the present disclosure describes a solution that identifies whether a computing device is being utilized by a driver of a vehicle, and further, if the computing device is being utilized by the driver of the vehicle, the present solution restricts the number of features that may be utilized on the computing device. Further, in the example embodiment, the term "vehicle" refers to a car, truck, station wagon, sport utility vehicle, crossover, automobile, or a similar category of vehicle. In the example embodiment, the present disclosure determines whether the computing device is in a vehicle (rather than a train or another means of transportation) by utilizing a GPS module on the device, by identifying certain audio cues, considering the positioning of the device, etc. If the device is determined to be in a vehicle, the present disclosure determines if the device is located in a portion of the vehicle that corresponds to the driver by identifying a location of the computing device within the vehicle. If it is determined that the device is located in a portion of the vehicle that corresponds to the driver, the present solution determines if the device is mounted. Furthermore, the present solution describes restricting the usage of the device based on whether the device is mounted or not.

In the example embodiment, the present solution may restrict the usage of a device by a user that is driving, therefore, potentially saving lives. Furthermore, the present solution provides a smart solution to this problem by identifying and imposing an appropriate restriction level from a plurality of restriction levels based on identifying whether the device is mounted or not. Therefore, a driver who has mounted his/her device may have fewer restrictions imposed on their device than a driver who has not mounted his/her device (e.g., a driver who is holding the device in his/her hand).

Embodiments of the present disclosure will now be described in detail with reference to the accompanying Figures.

Figure 1:
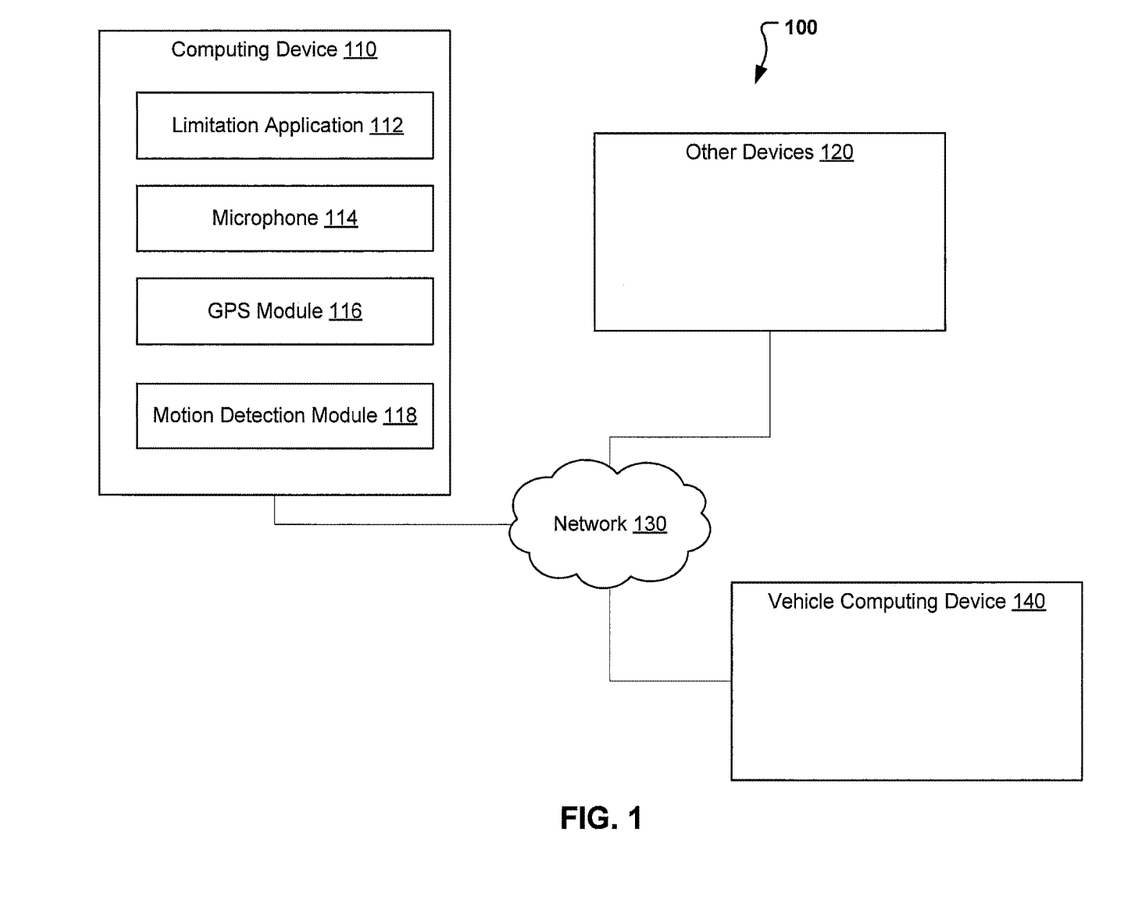
FIG. 1 illustrates a phone detection system, in accordance with an embodiment.

FIG. 1 illustrates phone detection system 100, in accordance with an embodiment. In the example embodiment, phone detection system 100 includes computing device 110 and other devices 120 interconnected via network 130.

In the example embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a Bluetooth, a local area network (LAN), or a wide area network (WAN). In general, network 130 can be any combination of connections and protocols that will support communications between computing devices, such as between computing device 110 and other devices 120.

Other devices 120 may include one or more computing devices or servers. In the example embodiment, each device of other devices 120 may be a desktop computer, a laptop computer, a tablet computer, a mobile device, a handheld device, a thin client, wearable, or any other electronic device or computing system capable of receiving and sending data to and from other computing devices, such as computing device 110, via network 130. Although not shown, optionally, other devices 120 can comprise a cluster of servers executing the same software to collectively process requests as distributed by a front-end server and a load balancer. Other devices 120 is described in more detail with reference to FIG. 5.

In the example embodiment, vehicle computing device 140 is a computing device located in a vehicle. In the example embodiment, vehicle computing device 140 may be a desktop computer, a laptop computer, a tablet computer, a mobile device, a handheld device, a thin client, wearable, or any other electronic device or computing system capable of receiving and sending data to and from other computing devices, such as computing device 110, via network 130. Although not shown, optionally, vehicle computing device 140 140 can comprise a cluster of servers executing the same software to collectively process requests as distributed by a front-end server and a load balancer. Vehicle computing device 140 is described in more detail with reference to FIG. 5.

Computing device 110 includes limitation application 112, microphone 114, Global Positioning System (GPS) module 116, and motion detection module 118. In the example embodiment, computing device 110 is a computing device such as a smartphone, however in other embodiments, computing device 110 may be a desktop computer, a laptop computer, a tablet computer, a handheld device, a thin client, wearable or any other electronic device or computing system capable of receiving and sending data to and from other computing devices, such as other devices 120, via network 130. Computing device 110 is described in more detail with reference to FIG. 5.

In the example embodiment, microphone 114 allows for the capture of audio information by computing device 110. Furthermore, in the example embodiment, GPS module 116 may be a hardware component, a software component, or a combination of both. Further, in the example embodiment, GPS module 116 is capable of communicating with one or more GPS satellites, or one or more computing devices (or servers) via network 130, in order to obtain location information corresponding to computing device 110. Additionally, motion detection module 118 may include one or more sensors (such as a gyroscope) that are capable of detecting whether computing device 110 is in motion. Further, motion detection module 118 may be referenced in order to determine if computing device 110 is mounted to a vehicle (determine if the computing device 110 is stationery).

In the example embodiment, limitation application 112 is a program that is capable of analyzing location information corresponding to computing device 110, and further determining whether computing device 110 is in a vehicle. In the example embodiment, limitation application 112 is further capable of analyzing auditory information and determining a position of computing device 110 within the car based on the auditory analysis. In another example embodiment, limitation application 112 is also capable of analyzing motion detection information to determine if computing device 110 is being manipulated by the user. In addition, limitation application 112 is a capable of imposing restrictions on computing device 110 based on the auditory information, determined location and/or motion detection of the device. Limitation application 112 is described in further detail with regard to FIGS. 2 through 4.

Figure 2:
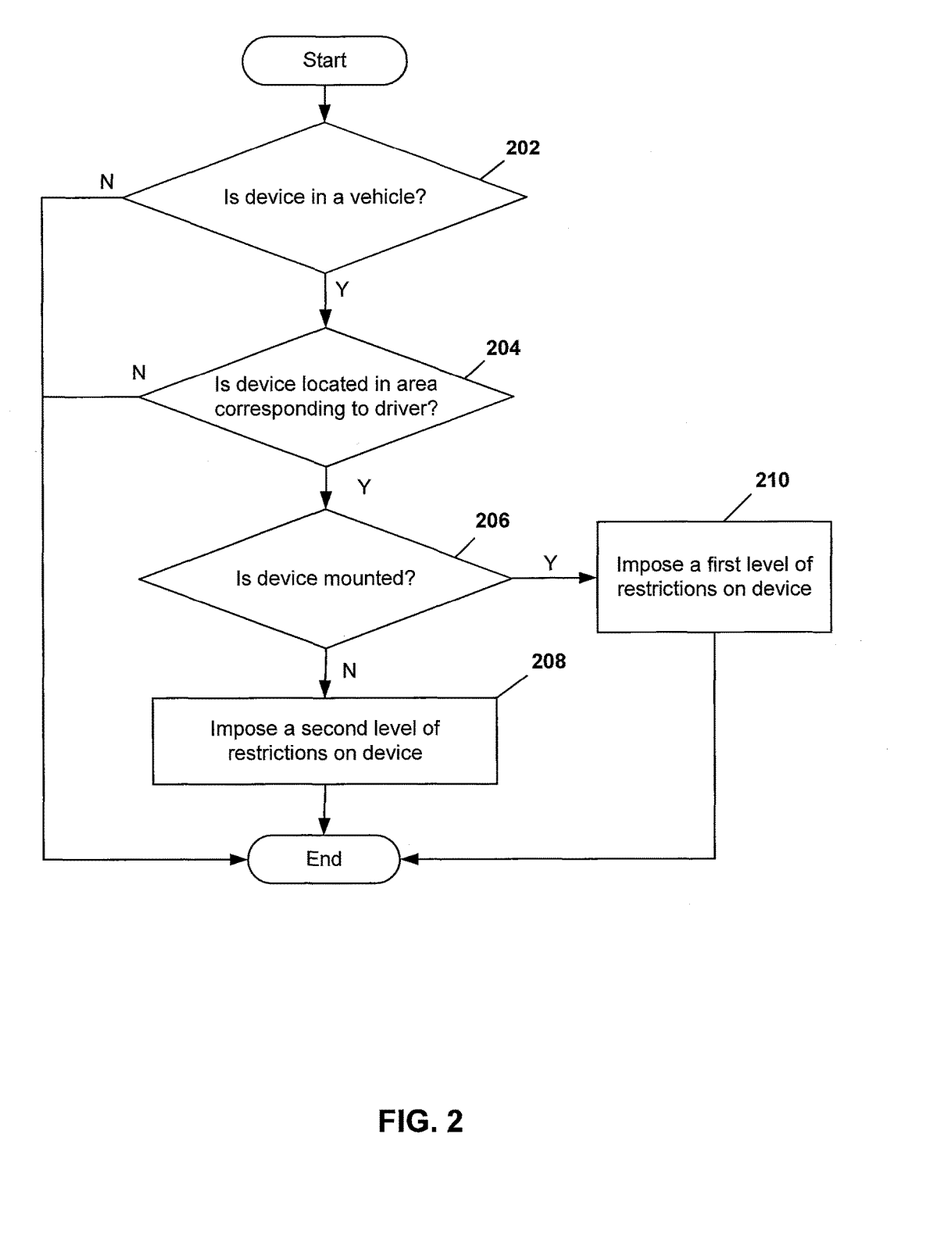
FIG. 2 is a flowchart illustrating the operations of the limitation application of FIG. 1 in identifying whether a device is located within a portion of the vehicle that corresponds to the driver, and if so, limiting the features of the device that are accessible, in accordance with an embodiment.

FIG. 2 is a flowchart illustrating the operations of limitation application 112 in identifying whether a device is located within a quadrant of a vehicle that corresponds to the driver of the vehicle, in accordance with an embodiment. In the example embodiment, limitation application 112 determines whether computing device 110 is located in a vehicle (decision 202). In the example embodiment, limitation application may utilize GPS module 116 to obtain location information corresponding to computing device 110. Alternatively, location information corresponding to computing device 110 may be determined, using at least a GPS sensor located on the vehicle. In another embodiment, the location information corresponding to the computing device 110 may be determined using one or more networks. For example, a WiFi, WLAN, PAN, cellular, or other communication network may be used to obtain location information. Additionally, the network information may derive internally from the vehicle or externally as a by-product of the interconnection between the networks using one or more location processes such as triangulation.

Limitation application 112 may further analyze the location information and determine, based on the location information, whether computing device 110 is currently located in a vehicle. For example, limitation application 112 may analyze current location information and determine that the location of computing device 110 is following a specific train route, and therefore, determine that computing device 110 is located on a train (and not a vehicle). In another example, limitation application 112 may analyze current location information and determine using a gyroscope, accelerometer, or other sensing device, that computing device 110 is in motion on a highway at a speed corresponding to a vehicle, and therefore, determine that computing device 110 is located in a vehicle. In further embodiments, limitation application 112 may utilize microphone 114 to capture acoustic data or utilize a camera component of computing device 110 to capture an image, and based on analysis of the acoustic data and/or image, determine whether computing device 110 is in a vehicle. For example, limitation application 112 may capture acoustic data that includes a train whistle or the sound of a conductor speaking, analyze the data, and based on the analysis determine that computing device 110 is located on a train (and therefore, not a vehicle).

If limitation application 112 determines that computing device 110 is not located in a vehicle (decision 202, "NO" branch), limitation application 112 continues to monitor location information corresponding to computing device 110. If limitation application 112 determines that computing device 110 is located in a vehicle (decision 202, "YES" branch), limitation application 112 determines whether computing device 110 is located in the area of the vehicle that corresponds to the driver (decision 204). In the example embodiment, limitation application 112 determines whether computing device 110 is located in the area of the vehicle that corresponds to the driver by utilizing microphone 114 to capture sound being transmitted by one or more speakers in the vehicle. Furthermore, limitation application 112 may communicate with vehicle computing device 140 and cause vehicle computing device 140 to transmit sound through each respective speaker. In other words, limitation application 112 may communicate with vehicle computing device 140 and instruct vehicle computing device 140 to transmit sound through a passenger side car speaker at time one and then through a driver side speaker at time two, and so on (additional speakers may be utilized as needed). Example sounds may be a pulse pattern or a continuous sound, and each speaker may be called on to play a different frequency. Since the predefined pattern and/or frequency is known, the device can easily determine which speaker the sound is coming from and utilize that information for location determination purposes. Limitation application 112 may utilize microphone 114 to capture the sound received by each speaker, and then determine which quadrant of the vehicle computing device 110 is located based on identifying how long it takes for the sound to travel from the car speaker to the microphone. For example, limitation application 112 may communicate with vehicle computing device 130 to cause the four speakers at the four corners of the interior of the car to each play a different frequency. Then computing device 110 can identify the amount of time in which each of the played sound released by the car speaker is detected and captured by microphone 114, and based on analyzing the time the sound takes to travel from each speaker to computing device 110, limitation application 112 determines the quadrant of the vehicle in which computing device 110 is located. More specifically, the travel time to each speaker may be analyzed with respect to the dimensions of the interior of the car to determine the quadrant/area of the vehicle that computing device 110 is located in. As another example, the microphone(s) located within the vehicle may be used to measure a signal strength deriving from each passenger in the vehicle to determine a location of each passenger and correlate this with a motion, input, or location of the computing device 110.

In one or more embodiments, limitation application 112 may communicate with vehicle computing device 140 or utilize one or more weight sensors in the seats of the vehicle to determine if there are passengers in the vehicle (based on a load detected with regard to each seat). If limitation application 112 determines that there are no passengers in the vehicle, limitation application 112 may determine that computing device 110 is located in the quadrant/area of the vehicle that corresponds to the driver.

In additional embodiments, limitation application 112 may communicate with other devices 120 that are present in the vehicle. For example, limitation application 112 may utilize a Bluetooth connection to identify if there are additional mobile devices in the vicinity (i.e., within the vehicle). Limitation application 112 may utilize triangulation techniques to determine whether the other device is to the left or to the right of computing device 110. Based on the orientation of the vehicle (whether the driver side is on the right side of the car or the left side of the car), limitation application 112 may be able to determine whether computing device 110 is within the quadrant/area corresponding to the driver based on determining a location in relation to the other device.

In further embodiments, limitation application 112 may utilize a camera on computing device 110 or a camera on another device present in the vehicle to capture an image or video, and based on analysis of the image/video, determine whether computing device 110 is located within the quadrant/area corresponding to the driver of the vehicle. For example, limitation application 112 may utilize a camera on computing device 110 to capture a video of the user and analyze eye movement of the user of computing device 110. In this example, limitation application 112 may compare the eye movement of the user of computing device 110 corresponds to historical eye movement information, contained in a database, of known drivers, and/or of the user of computing device 110 (while driving). If a similarity level between the eye movement of the user of computing device 110 and the eye movement information contained in the database is above a first threshold amount, limitation application 112 may determine that computing device 110 is within the quadrant/area of the vehicle that corresponds to the driver. Additionally, one or more of the described methods above may be utilized together by limitation application 112 to determine whether computing device 110 is within the quadrant/area corresponding to the driver.

If limitation application 112 determines that computing device 110 is not located in the area of the vehicle that corresponds to the driver (decision 204, "NO" branch), limitation application 112 continues to monitor and determine if, at a later time, the location of computing device 110 moves into the quadrant/area of the vehicle (or another vehicle) that corresponds to the driver.

If limitation application 112 determines that computing device 110 is located in the area of the vehicle that corresponds to the driver (decision 204, "YES" branch), limitation application 112 determines if computing device 110 is mounted to the vehicle (decision 206). In the example embodiment, limitation application 112 utilizes a gyroscope present on computing device 110 to determine an orientation of computing device 110. Further, if limitation application 112 determines that the orientation is either a vertical or horizontal orientation for longer than a threshold time period, limitation application 112 may determine that computing device 110 is mounted. In the example embodiment, the threshold time period is 10 seconds, however, in other embodiments, the threshold time period may be another amount of time. In addition, in one or more embodiments, limitation application 112 may determine that computing device 110 is mounted if it determines that computing device 110 is within a predefined number of degrees of a vertical or horizontal orientation for the threshold period of time. For example, if limitation application 112 determines that computing device 110 is within 5 degrees of being in an upright vertical position, and further detects that computing device 110 has been in the position for at least the threshold period of time, limitation application 112 may determine that computing device 110 is mounted.

In other embodiments, limitation application 112 may utilize one or more sensors on computing device 110 to detect a vibration pattern corresponding to computing device 110. A device that is mounted to a vehicle may experience a certain pattern of small vibrations due to being physically connected to the vehicle. Conversely, since the connection between the device and a person holding the device is not as rigid as that of a phone mount, the vibration pattern will be more dampened. Therefore, limitation application 112 may compare the detected vibration patterns to vibration patterns corresponding to similar mounted devices, and further determine a similarity level between the compared vibration patterns. If limitation application 112 determines that the similarity level between the detected vibration patterns and the vibrations patterns corresponding to similar mounted devices is above a second threshold amount, limitation application 112 may determine that computing device 110 is mounted to the vehicle.

If limitation application 112 determines that computing device 110 is not mounted to the vehicle (decision 206, "NO" branch), limitation application 112 may impose a second level of restrictions on computing device 110 (step 208). If limitation application 112 determines that computing device 110 is mounted to the vehicle (decision 206, "YES" branch), limitation application 112 may impose a first level of restrictions on computing device 110 (step 210). In the example embodiment, the second level of restrictions provides a more restrictive experience to the user than the first level of restrictions. For example, the first level of restrictions may include ability to access a GPS application for the purpose of driving directions, while the second level of restrictions may not allow access the GPS application. Alternatively, the first level of restriction may allow access to GPS via touch or voice command while the second level of restriction limits GPS use to voice commands. In one or more embodiments, the second level of restrictions may cause all device features of computing device 110 to not be accessible, unless the restrictions are subsequently removed by limitation application 112. Additionally, when the device is determined to be mounted, limitation application 112 may cause the device to display enlarged icons to facilitate the activation of the icon while the vehicle is in motion. In some embodiments, those applications that are restricted out by the first or second levels of restrictions will be removed from being displayed on the screen, thereby providing additional area to which the icons can be enlarged. For example, if the icons for certain restricted out applications are removed from being displayed, the icons that remain may be rearranged and enlarged so that they are evenly distributed in the new space.

Furthermore, in one or more embodiments, limitation application 112 may impose the first level or second level of restrictions if limitation application determines that the vehicle is traveling at a speed above a certain threshold speed. In addition, if the first level or second level of restrictions has been imposed, and limitation application detects, for example by monitoring GPS location information, that the speed of the vehicle has dropped below the threshold speed, limitation application may remove the restrictions.

In addition, in one or more embodiments, limitation application 112 may reside on a server device and may perform the functions described above by utilizing a network, such as network 130. In additional embodiments, limitation application 112 may reside on a server device and communicate with a client side application residing on computing device 110, and further utilize the client side application to perform one or more of the functions described above. For example, in these additional embodiments, the client side application may be utilized to gather information corresponding to computing device 110 and the vehicle that computing device 110 may be in, such as, location information corresponding to computing device 110, and sound information captured from one or more speakers in a vehicle that computing device 110 may be present in. Further, the client side application may be utilized by limitation application 112 to impose one or more restrictions on computing device 110.

Figure 3:
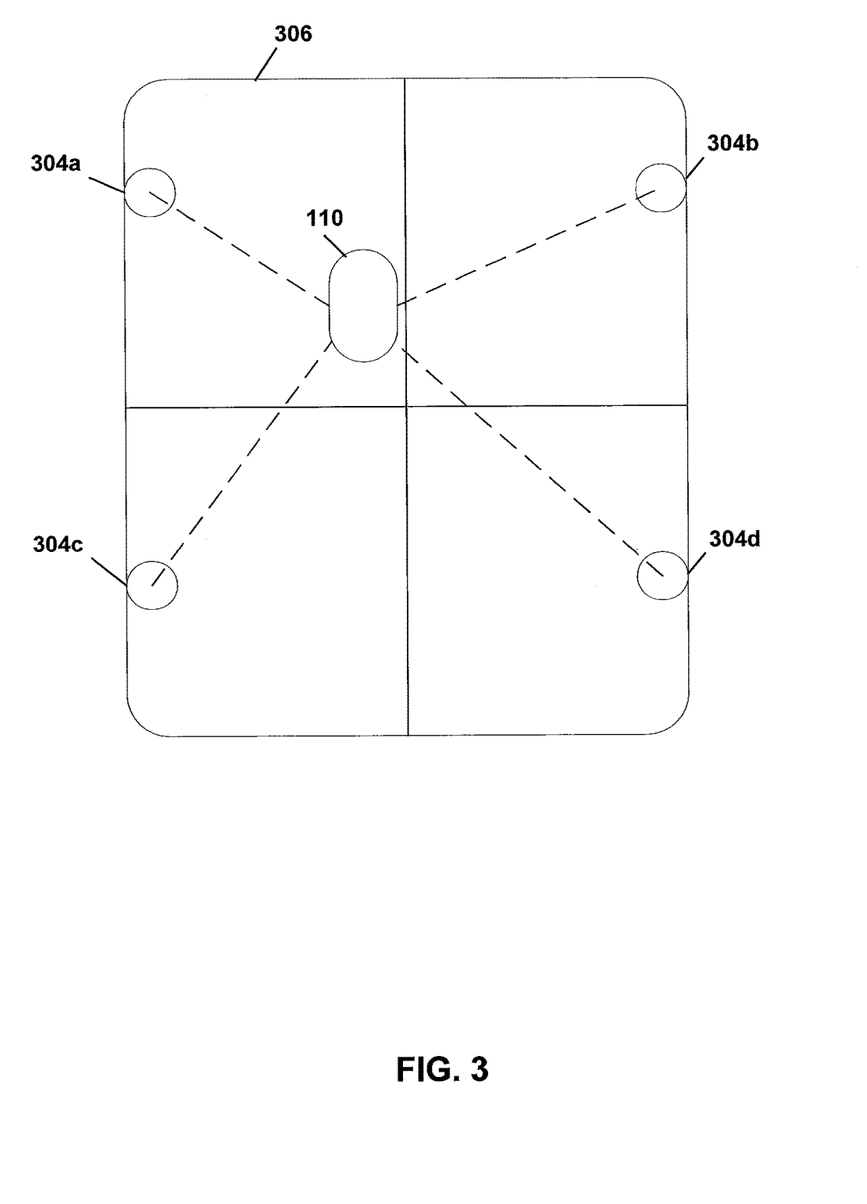
FIG. 3 is an illustration of the computing device of FIG. 1 utilizing a microphone component to capture sound from a speaker in a vehicle in order to determine a location of the computing device in the vehicle, in accordance with an embodiment.

FIG. 3 is an illustration of the computing device 110 utilizing microphone 114 to capture sound from a set of speakers in a vehicle in order to determine a location of the computing device in the vehicle, in accordance with an embodiment. In the example embodiment, FIG. 3 illustrates the triangulation of computing device 110 in vehicle 306 by utilizing car speaker 304*a*, car speaker 304*b*, car speaker 304*c*, and car speaker 304*d*. As described above, limitation application 112 utilizes microphone 114 to capture sound from speaker 304*a*, speaker 304*b*, 304*c*, and 304*d*, and further based on time it takes for the sound to reach microphone 114, determines that computing device 110 is located in the quadrant/area of vehicle 306 that corresponds to the driver.

Figure 4:
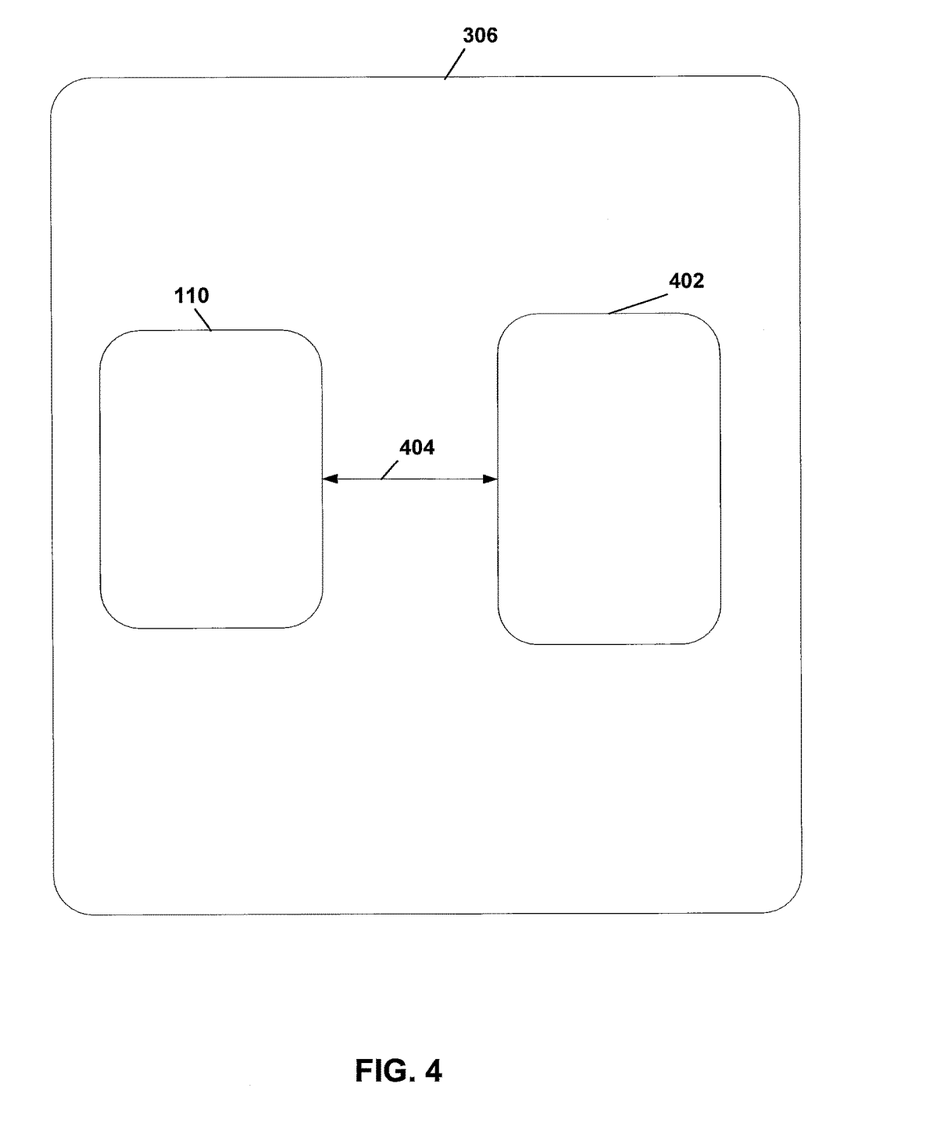
FIG. 4 is an illustration of the computing device of FIG. 1 communicating with a second device in a vehicle in order to determine a location of the computing device in the vehicle, in accordance with an embodiment.

FIG. 4 is an illustration of computing device 110 communicating with a second device in vehicle 306 in order to determine a location of computing device 110 in vehicle 306, in accordance with an embodiment. In the example embodiment, FIG. 4 depicts computing device 110 utilizing communication link 404 to communicate with computing device 402. As described above, limitation application 112 may determine the quadrant/area of computing device 110 in vehicle 306 based on the relative location of computing device 110 with respect to computing device 402. For example, if limitation application 112 determines, based on information obtained via communication link 404, that computing device 402 is to the right of computing device 110, limitation application 112 may determine that computing device 110 is the quadrant/area corresponding to the driver (assuming the car orientation has the driver on the left side of the vehicle). Furthermore, as discussed above, multiple factors may be taken into account to identify the quadrant/area of vehicle 306 that corresponds to computing device 110. For example, limitation application 112 may communicate with a computing device of vehicle 306 to determine that, based on information provided by weight sensors in the seats, only the front two seats of vehicle 306 are occupied. Furthermore, limitation application 112 may utilize communication link 404, as described, to determine that the relative location of computing device 110 is to the right of computing device 402, and based on both findings, determine that computing device 110 is located in the quadrant/area corresponding to the driver of vehicle 306.

Furthermore, in one or more embodiments, limitation application 112 may utilize one or more sensors of motion detection module 118 to identify if computing device 110 is in motion, and therefore, being utilized. Based on determining that computing device 110 is being utilized, limitation application 112 may impose the first or second level of restrictions on the device.

The foregoing description of various embodiments of the present disclosure has been presented for purposes of illustration and description. It is not intended to be exhaustive nor to limit the disclosure to the precise form disclosed. Many modifications and variations are possible. Such modifications and variations that may be apparent to a person skilled in the art of the disclosure are intended to be included within the scope of the disclosure as defined by the accompanying claims.

Figure 5:
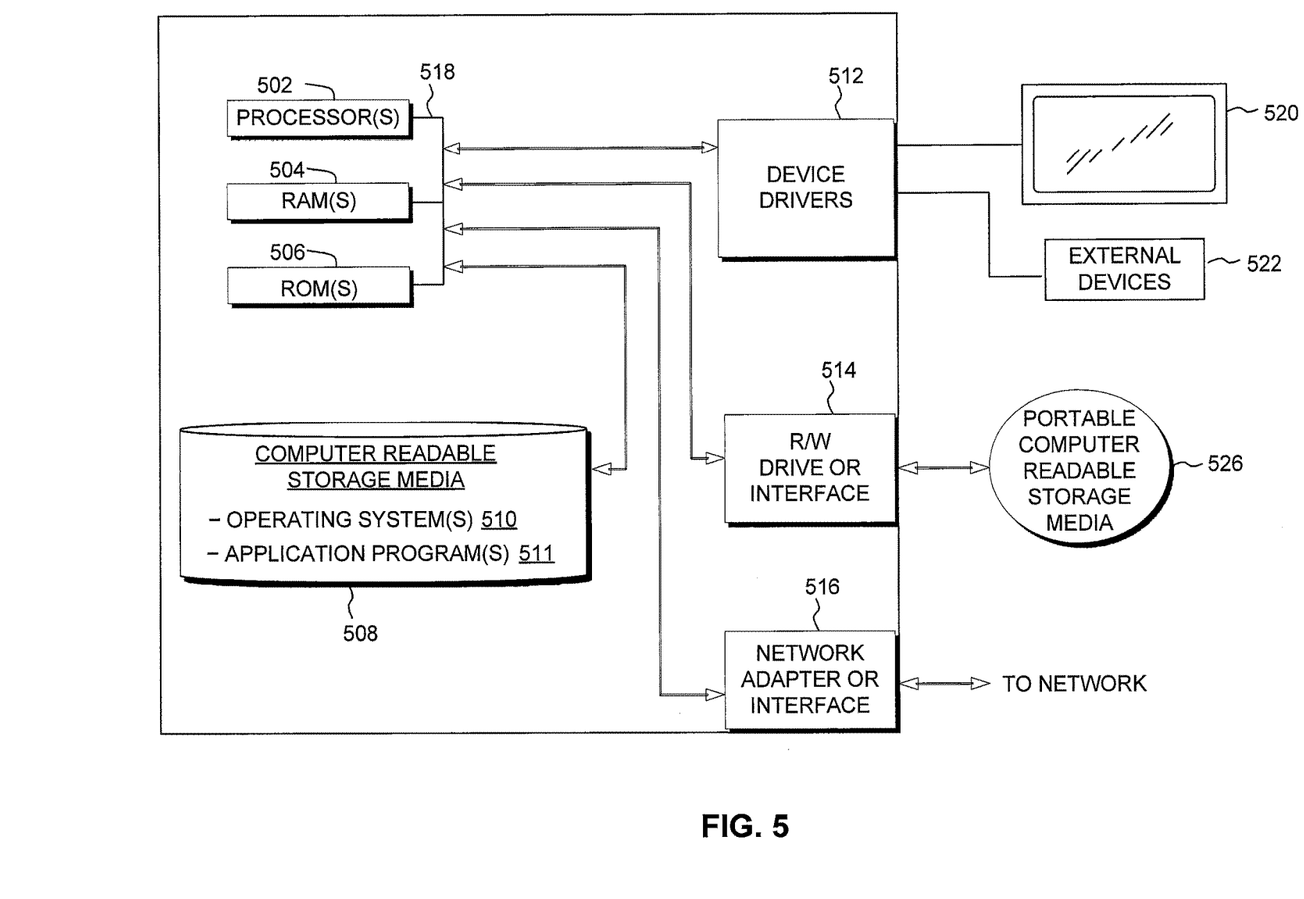
FIG. 5 is a block diagram depicting the hardware components of the phone detection system of FIG. 1, in accordance with an embodiment.

FIG. 5 depicts a block diagram of components of computing devices contained in phone detection system 100 of FIG. 1, in accordance with an embodiment. It should be appreciated that FIG. 5 provides only an illustration of one implementation and does not imply any limitations with regard to the environments in which different embodiments may be implemented. Many modifications to the depicted environment may be made.

Computing devices may include one or more processors 502, one or more computer-readable RAMs 504, one or more computer-readable ROMs 506, one or more computer readable storage media 508, device drivers 512, read/write drive or interface 514, network adapter or interface 516, all interconnected over a communications fabric 518. Communications fabric 518 may be implemented with any architecture designed for passing data and/or control information between processors (such as microprocessors, communications and network processors, etc.), system memory, peripheral devices, and any other hardware components within a system.

One or more operating systems 510, and one or more application programs 511, for example, limitation application 112, are stored on one or more of the computer readable storage media 508 for execution by one or more of the processors 502 and by utilizing one or more of the respective RAMs 504 (which typically include cache memory). In the illustrated embodiment, each of the computer readable storage media 508 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing devices may also include a R/W drive or interface 514 to read from and write to one or more portable computer readable storage media 526. Application programs 511 on the computing devices may be stored on one or more of the portable computer readable storage media 526, read via the respective R/W drive or interface 514 and loaded into the respective computer readable storage media 508.

Computing devices may also include a network adapter or interface 516, such as a TCP/IP adapter card or wireless communication adapter (such as a 4G wireless communication adapter using OFDMA technology). Application programs 511 on the computing devices may be downloaded to the computing devices from an external computer or external storage device via a network (for example, the Internet, a local area network or other wide area network or wireless network) and network adapter or interface 516. From the network adapter or interface 516, the programs may be loaded onto computer readable storage media 508. The network may comprise copper wires, optical fibers, wireless transmission, routers, firewalls, switches, gateway computers and/or edge servers.

Computing devices may also include a display screen 520, and external devices 522, which may include, for example a keyboard, a computer mouse and/or touchpad. Device drivers 512 interface to display screen 520 for imaging, to external devices 522, and/or to display screen 520 for pressure sensing of alphanumeric character entry and user selections. The device drivers 512, R/W drive or interface 514 and network adapter or interface 516 may comprise hardware and software (stored on computer readable storage media 508 and/or ROM 506).

The programs described herein are identified based upon the application for which they are implemented in a specific embodiment. However, it should be appreciated that any particular program nomenclature herein is used merely for convenience, and thus the disclosure should not be limited to use solely in any specific application identified and/or implied by such nomenclature.

Based on the foregoing, a computer system, method, and computer program product have been disclosed. However, numerous modifications and substitutions can be made without deviating from the scope of the present disclosure. Therefore, the various embodiments have been disclosed by way of example and not limitation.

Various embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system, comprising:
   a global positioning module;
   a microphone;
   a non-transitory memory; and
   one or more hardware processors coupled to the non-transitory memory and configured to execute instructions to cause the system to perform operations comprising:
      receiving position data from the global positioning module;
      determining, from the position data, that a location of a computing device corresponds to a vehicle that is in motion;
      communicating, responsive to determining that the location of the computing device corresponds to the vehicle that is in motion, with a vehicle computing device of the vehicle to cause one or more speakers of the vehicle to emit sound;
      capturing the sound from the one or more speakers through the microphone;
      identifying a sound travel time of the sound from each of the one or more speakers to the computing device;
      determining, based on the sound travel time, one or more distances from the computing device to each of the one or more speakers;
      determining, based on the determined one or more distances, that the location of the computing device corresponds to an area in the vehicle that is associated with a driver of the vehicle; and
      in response to determining that the location of the computing device corresponds to the vehicle that is in motion and corresponds to the area in the vehicle that is associated with the driver of the vehicle, imposing one or more restrictions on a usage of the computing device.

2. The computer system of claim 1, wherein the operations further comprise determining whether the computing device is mounted to the vehicle.

3. The computer system of claim 2, wherein the one or more restrictions comprises a first level of restrictions based on determining that the computing device is mounted on the vehicle, wherein the first level of restrictions disables a fewer number of features of the computing device than a second level of restrictions.

4. The computer system of claim 2, wherein the one or more restrictions comprises a second level of restrictions based on determining that the computing device is not mounted on the vehicle, wherein the second level of restrictions disables a greater number of features of the computing device than a first level of restrictions.

5. The computer system of claim 2, wherein the determining whether the computing device is mounted to the vehicle includes determining whether an orientation of the computing device is within a predefined number of degrees of a horizontal orientation or a vertical orientation.

6. The computer system of claim 1, wherein the causing the one or more speakers of the vehicle to emit sound comprises causing a first speaker to emit a first sound at a first time and/or first frequency and causing a second speaker to emit a second sound at a second time and/or second frequency.

7. The computer system of claim 1, wherein the determining the location of the computing device corresponds to an area in the vehicle that is associated with a driver of the vehicle is further based on load information received from one or more weight sensors corresponding to one or more seats of the vehicle.

8. A non-transitory machine-readable medium having stored thereon machine-readable instructions executable to cause a machine to perform operations comprising:
   determining, from global positioning data, that a location of a computing device corresponds to a vehicle that is in motion;
   communicating, responsive to determining that the location of the computing device corresponds to the vehicle that is in motion, with a vehicle computing device of the vehicle to cause one or more speakers of the vehicle to emit sound;
   capturing the sound through a microphone;
   identifying a sound travel time of the sound from each of the one or more speakers to the computing device;
   determining, based on the sound travel time, one or more distances from the computing device to each of the one or more speakers;
   determining, based on the determined one or more distances, that the location of the computing device corresponds to an area in the vehicle that is associated with a driver of the vehicle; and
   in response to determining that the location of the computing device corresponds to the vehicle that is in motion and corresponds to the area in the vehicle that is associated with the driver of the vehicle, imposing one or more restrictions on a usage of the computing device.

9. The non-transitory machine-readable medium of claim 8, wherein the operations further comprise determining whether the computing device is mounted to the vehicle.

10. The non-transitory machine-readable medium of claim 9, wherein the one or more restrictions comprises a first level of restrictions based on determining that the computing device is mounted on the vehicle, wherein the first level of restrictions disables a fewer number of features of the computing device than a second level of restrictions.

11. The non-transitory machine-readable medium of claim 9, wherein the one or more restrictions comprises a second level of restrictions based on determining that the computing device is not mounted on the vehicle, wherein the second level of restrictions disables a greater number of features of the computing device than a first level of restrictions.

12. The non-transitory machine-readable medium of claim 9, wherein the determining whether the computing device is mounted to the vehicle includes determining whether an orientation of the computing device is within a predefined number of degrees of a horizontal orientation or a vertical orientation.

13. The non-transitory machine-readable medium of claim 9, wherein the causing the one or more speakers of the vehicle to emit sound comprises causing a first speaker to emit a first sound with a first sound pattern and causing a second speaker to emit a second sound with a second sound pattern.

14. The non-transitory machine-readable medium of claim 8, wherein the determining the location of the computing device corresponds to an area in the vehicle that is associated with a driver of the vehicle is further based on load information received from one or more weight sensors corresponding to one or more seats of the vehicle.

15. The non-transitory machine-readable medium of claim 8, wherein the global positioning data is received from a GPS component of the computing device configured to identify a speed associated with the computing device.

16. A method, comprising:
receiving location data;
determining, from the location data, that a location of a computing device corresponds to a vehicle that is in motion;
causing one or more speakers of the vehicle to emit sound;
capturing the sound from the one or more speakers;
identifying a sound travel time of the sound from each of the one or more speakers to the computing device;
determining, based on the sound travel time, one or more distances from the computing device to each of the one or more speakers;
determining, based on the determined one or more distances, that the location of the computing device corresponds to an area in the vehicle that is associated with a driver of the vehicle; and
in response to determining that the location of the computing device corresponds to the vehicle that is in motion and corresponds to the area in the vehicle that is associated with the driver of the vehicle, imposing one or more restrictions on a usage of the computing device.

17. The method of claim 16, further comprising determining whether the computing device is mounted to the vehicle.

18. The method of claim 17, wherein the one or more restrictions comprises a first level of restrictions based on determining that the computing device is mounted on the vehicle, wherein the first level of restrictions disables a fewer number of features of the computing device than a second level of restrictions, wherein the second level of restrictions corresponds to non-mounted devices.

19. The method of claim 18, wherein the determining whether the computing device is mounted to the vehicle includes determining whether an orientation of the computing device is within a predefined number of degrees of a horizontal orientation or a vertical orientation.

20. The method of claim 16, wherein the location data comprises communication network data.

* * * * *